Feb. 3, 1970 A. S. KHOURI 3,493,825

FLAT CAPACITOR

Filed Dec. 19, 1967

Alfred S. Khouri

INVENTOR

United States Patent Office 3,493,825
Patented Feb. 3, 1970

3,493,825
FLAT CAPACITOR

Alfred S. Khouri, Los Angeles, Calif., assignor to Bestran Corporation, Monrovia, Calif., a corporation of California Filed Dec. 19, 1967, Ser. No. 696,967
Int. Cl. H01g *1/00;* H02b *1/04*
U.S. Cl. 317—258 6 Claims

ABSTRACT OF THE DISCLOSURE

A flat capacitor has two identical opposing electrodes. The structure of the capacitor facilitates automatic placement and attachment of the capacitor to terminal lands of a flat film circuit substrate.

This invention relates to a novel design of a miniature, parallel plate, fixed capacitor device which is of particular value in the construction of "hybrid" circuit assemblies, such as, coupling, bypass, or filter circuits employing concepts of stencil screened, or otherwise deposited metallic film on a dielectric substrate to provide for the formation or attachment of other electrical components mounted on its surfaces.

This capacitor is optimumly constructed for automatic placement and attachment to terminal lands on a planar type, conductive film circuit substrate.

It is an object of this invention to provide a parallel plate fixed capacitor whose design is achieved by employing identical bilateral, dual patterned, opposing electrode-plate pairs constructed on each face of the dielectric in order that after being connected to the substrate land terminals by either side, develops an identical specified capacity value.

Still another object of this invention is to provide a parallel plate fixed capacitor device which after being connected to the substrate terminal lands by the electrode patterns on either side, develops a specified capacity value; however, after attachment, this capacitor device is simply and readily modified to have a new and permanently higher specified fixed capacity value.

The novel features which are considered characteristic of this invention are set forth with particularity in the appended claims. The invention itself, however, as to its organization and method of operation, together with additional objectives and advantages thereof, will best be understood from a specific embodiment when read in connection with the accompanying drawings.

FIG. 1 is a top plan view of the invention concept constructed on a ¼" dia. dielectric disc 8, together with the manner of connecting to the appropriate terminal lands 7, on the substrate.

FIG. 2 is a sectional view, taken on line A—A of FIG. 1 showing the opposed, bilateral plate-electrode pair patterns 1, 2 and 3, 4 constructed on the dielectric disc and attached to the land terminals on the substrate 10.

This capacitor device is preferably constructed on a disc of solid dielectric material such as plastic, glass, or ceramic. High dielectric constant compositions of titanate ceramics, well known in the art, are particularly useful in securing the larger capacity values needed in many electrical circuits. Also, of course, the methods of stencil screening and firing silver compositions to form capacitor plates is well known in the art.

Figure 1:
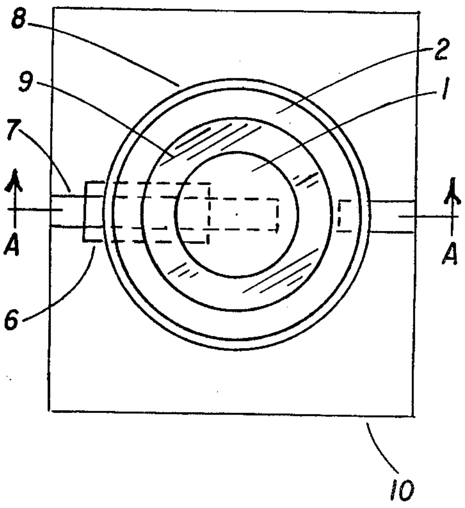
Figure 2:
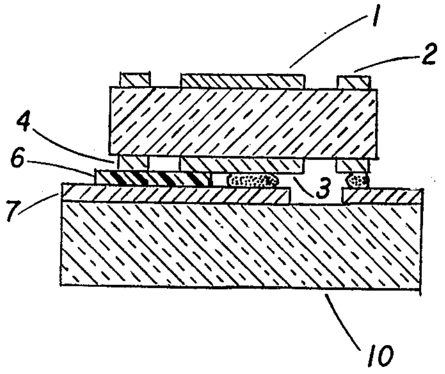

Referring now to the embodiment detailed in FIGS. 1 and 2, it can be observed that the unique advantages of the bilateral symmetry of this capacitor device is achieved by employing circular patterns of identical, parallel opposed plate-electrodes on each face.

Specifically, the pattern on the faces consist of central area electrodes 1 and 3 surrounded, but separated from, the annular plate-electrodes 2 and 4.

Figure 3:
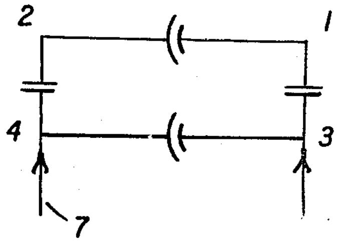
FIG. 3 is a schematic diagram of the circuit relationship in the structure of the capacitor device.

One object of this invention is to provide a capacitor device construction which affords the same capacity when connected to its terminal lands regardless of which face it is attached by. This can best be understood by referring to FIG. 3. It is evident from the circuit relationship of the elements in the capacity device structure, that an identical capacity will exist when connected to the land terminals by the plate electrode pairs of either face.

Of course an important advantage of the invention is the labor savings gained in the automatic loading of this capacitor device against the terminal lands of the circuit substrate for connection. For example: the capacitor device discs can be fed from a randomly loaded hopper using a Syntron type channel feed of the discs to a template positioning mold containing the substrate to locate the capacitor devices over their appropriate terminal land mounting positions *by either face*. However, it is obvious that terminal land 7 connecting to the center electrode, be insulated with tape, varnish or glaze 6 to prevent shorting.

An additional labor savings is achieved in the automatic loading of this fixed, specified value capacitor device to provide a second, specified different and permanently higher value after connection to the substrate, when desired, by a simple and readily performed modification of bridging or interconnecting the exposed electrode-plate gap 9. This is easily accomplished with solder or a conductive cement. The gap separation is kept narrow to facilitate this simple modification to effect this permanent change to a significantly different and higher value where required.

Figure 4:
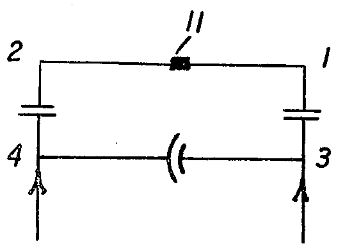
FIG. 4 is a schematic diagram of this capacitor device in its converted form to have a higher specified fixed capacity value by the bridging of the exposed gap shown as connection 11.

The manner in which this modification effects this change and increase in capacity value is readily understood by referring to FIG. 4. As constructed the capacitor device when connected to the land terminals by either face, comprises a symmetrical network consisting of an "edge" capacitor 3, 4 looped by a series capacitance ring consisting of two parallel plate capacitors in series with the "edge" capacitor on the opposing face.

When the two plate-electrodes on this face are bridged or interconnected, the two parallel plate capacitors 3, 1 and 4, 2 are connected directly in series, in parallel across the "edge" capacity attached to the land terminals.

Having described my invention in one of its preferred embodiments, I claim as my invention all that is commensurate with the spirit and scope of the following claims.

What I claim is:

1. A parallel plate capacitor comprising a disc of dielectric material having two pairs of opposed bilateral plate electrode patterns in which each pair consists of a disc shaped central plate electrode surrounded by but separated from an annular plate electrode the two disc electrodes being of substantially equal area, the two annular electrodes being of substantially equal area.

2. The symmetrical parallel plate capacitor device constructed as claimed in claim 1, which will develop the same capacity between terminal lands regardless of which side is connected.

3. The capacitor of claim 1 whereby the plates on one side of the disc can be connected to specifically increase the capacitance.

4. A parallel plate capacitor device of claim 2 constructed on plastic.

5. A parallel plate capacitor device of claim 2 constructed on glass.

6. A parallel plate capacitor device of claim 2 constructed on ceramic.

References Cited

UNITED STATES PATENTS

| | | | |
|---|---|---|---|
| 2,777,110 | 1/1957 | Kodama | 317—242 X |
| 2,989,665 | 6/1961 | Khouri. | |

FOREIGN PATENTS

| | | |
|---|---|---|
| 1,172,425 | 10/1958 | France. |
| 758,424 | 8/1951 | Germany. |

OTHER REFERENCES

German Printed App. to Fahre No. 1,203,391, printed October 1965.

IBM Tech. Bulletin, vol. 5, No. 10, March 1963, pp. 115 and 116.

ELLIOTT A. GOLDBERG, Primary Examiner

U.S. Cl. X.R.

317—101, 242, 261